Patented Apr. 15, 1952

2,592,587

UNITED STATES PATENT OFFICE 2,592,587

LIGHT STABLE PHENOLIC SYNTANS

Daniel E. Nagy, Stamford, Conn., assignor to American Cyanamid Company, New York, N. Y., a corporation of Maine No Drawing. Application August 9, 1949, Serial No. 109,428

6 Claims. (Cl. 260—45.95)

This invention relates to synthetic phenolic tanning agents and more particularly to phenolic syntans which produce relatively light-colored leathers even after storage for a considerable period of time under ordinary storage conditions.

A number of different types of synthetic tannins have in the past been derived from phenols. These agents have met with considerable success in tanning processes where they have been used both alone and in combination with other tanning agents such as vegetable tannins and mineral tans. Since the phenolic syntans are more expensive, smaller proportions thereof have been used in conjunction with relatively larger proportions of the cheaper vegetable tannins or mineral tans.

Two of the most widely used phenolic syntan products are the nuclearly sulfonated phenol-formaldehyde resins and the condensation products of phenol and formaldehyde with an alkaline salt of sulfurous acid. One great disadvantage in the use of these products for tanning skins and hides, however, has been their initial dark color and their tendency to darken upon standing under normal conditions of storage. Thus, an unattractive commercial product which will rapidly darken on the shelf of either the supplier or the ultimate consumer, i. e., the tanner, has been offered. Moreover, the deep color of these phenolic syntans is in part transferred to the tanned leather so that a discolored leather, usually pink darkening to red during tanning, is obtained.

Attempts to remedy this situation have resulted in the development of initially light-colored phenolic syntans certain of which are stable against discoloration. Phenol-acetaldehyde condensation products and formaldehyde condensation products of sulfones such as dihydroxydiphenyl sulfone are examples of such syntans. These products, however, possess certain disadvantages including increased cost which have made it desirable to turn back to the sulfonated and sulfited phenol-formaldehyde syntans and attempt to devise some modification thereof which will produce uniformly light-colored leather whether the syntan solution is freshly prepared or taken from a shelf after storage there for a considerable period of time.

It is therefore an object of the present invention to so modify a phenolic syntan which discolors upon storage under normal conditions that it will become stable against such discoloration.

It is another object of the present invention to provide a new phenolic syntan solution which will produce light-colored tanned leather.

It is still another object of the present invention to prepare a new, initially light-colored phenolic syntan which is stable against discoloration upon storage under normal conditions and which will produce a light-colored tanned leather.

A further object of the present invention is the preparation of a phenolic syntan which is a nuclearly sulfonated condensation product of phenol and formaldehyde, said syntan being stable against discoloration upon storage under normal conditions.

Still another object of the present invention is the provision of a phenolic syntan which is stable against discoloration upon storage under normal conditions, the syntan being a condensation product of phenol, formaldehyde and an alkaline salt of sulfurous acid.

It is another object of the present invention to provide a process for stabilizing phenolic syntans which discolor upon storage against such discoloration.

An object of the present invention is to provide a process for stabilizing against darkening those phenolic syntans which normally darken under tanning conditions and impart a relatively deep color to the tanned leather.

The above and other objects are obtained by incorporating a small quantity of a vegetable tannin in an aqueous solution of a phenolic syntan which discolors upon storage under normal conditions or during tanning.

The invention will be described in greater detail in conjunction with the following specific examples in which proportions are given in parts by weight. It should be understood that the examples are given for purposes of illustration, and the scope of the invention is not to be measured by the details therein set forth.

Example 1

(1) 1395 parts (14.9 mols) of phenol.
(2) 720 parts (8.9 mols) of 37% aqueous formaldehyde.
(3) 38.6 parts of 10 N sulfuric acid.
(4) 288 parts of acetic anhydride.
(5) 670 parts of 100% sulfuric acid.

(1) and (2) are heated together at 95° C. in the presence of (3). Water and unreacted phenol are removed by vacuum distillation, and the viscous resin is diluted with (4). It is then sulfonated with (5) by heating for 5 hours at 70–75° C., diluted with water, neutralized with ammonia to a pH of 3.0, and further diluted with water to a 30% resin solids solution.

The solution of sulfonated phenol-formaldehyde resin is divided into portions and to each portion but one which is retained as a control is added a different vegetable tannin. Pickled calfskin squares are tanned with a portion of each of the syntan solutions by tumbling in 100% of the syntan diluted with water to 400% and containing 2.5% salt. The remaining portions of the solutions are then allowed to stand in the sunlight at about 20° to 30° C. for about 2.5 months, after which the tanning tests are repeated. Results observed appear below:

| Additive, 5% based on resin solids | Original | | After Storage | |
|---|---|---|---|---|
| | Color of Soln. | Color of Tanned Skin | Color of Soln. | Color of Tanned Skin |
| None (control) | red | pink white | deep red | pink. |
| Chestnut Extract | dark brown | light tan | dark brown | light tan. |
| Sulfited Quebracho Extract | brown | pink white | brown | pink white. |
| Wattle | ---do--- | ---do--- | ---do--- | Do. |
| Valonia (solid) | ---do--- | light pink | ---do--- | light pink. |

Because of the dark color of phenolic syntan solutions themselves and the even darker color of the vegetable tannins, it is difficult if not impossible to detect visually any color change taking place in mixtures of the two types of products upon storage, see preceding table. That color changes do not, in fact, take place at all or that only slight color changes take place—considerably less than in the untreated phenolic syntan solutions—is evidenced by the color of the tanned leather. Leather which has been tanned with the mixtures of the present invention is uniform in color in every case regardless of whether the treated syntan solutions are freshly prepared or have been stored in sunlight at room temperature for a period of time. Moreover, the color of the leather tanned with my new stabilized phenolic syntans after they have been stored as indicated is in every case lighter than that of leather tanned with untreated phenolic syntans after comparable storage and is the same as that of leather tanned with freshly prepared stabilized syntans. It will be apparent from the foregoing that color formation in tanned leather is prevented by addition of vegetable tannin material to phenolic syntan solutions and in addition, in the case of the chestnut extract, the slight pink color normally evident is masked. Thus, a light-colored leather may be produced at all times.

It is possible to prevent or substantially reduce color formation during the preparation of the phenolic syntans and storage thereof under normal conditions by maintaining a quantity of free sulfur dioxide present at all times. This method of stabilizing against color formation is fully described and claimed in my copending application entitled "Phenol-Formaldehyde Syntans Stable Against Discoloration," Serial No. 109,427, filed August 9, 1949. Such a syntan is advantageously treated with vegetable tannin according to the present invention so that the syntan solution is stable not only during its preparation and storage but also under conditions of tanning.

*Example 2*

(1) 107 parts (1.0 mol) of phenol containing 12% water.
(2) 44.6 parts (0.55 mol) of 37% aqueous formaldehyde.
(3) 5.2 parts of 10% hydrochloric acid.
(4) 28.6 parts (0.15 mol) of sodium metabisulfite.
(5) 28.4 parts (0.35 mol) of 37% aqueous formaldehyde.
(6) 24.4 parts (0.22 mol) of 36% aqueous sodium hydroxide.

(1), (2) and (3) are heated together as in Example 1. (6) is added, then (4) and (5), and the condensation is continued by heating at 90° C. for about 15–18 hours.

The alkaline syntan so produced is neutralized with 10 N sulfuric acid to a pH of 5–7 and then with 10% aqueous hydrochloric acid to a pH of 1.5–2. Air is blown through the acidified syntan at 90° C. to remove the free $SO_2$.

The sulfite-free syntan solution which is orange in color is divided into two portions and one is treated with 5% liquid chestnut extract as in Example 1. Both of the syntan solutions produce light-colored tanned leathers. After storage for about 2.5 months the treated syntan solution has not changed in color, and leather tanned therewith is light-colored just as was the original leather. The untreated portion of syntan rapidly becomes dark red in color and produces, when used as a tanning agent, a pink-colored leather.

Vegetable tannins are equally effective in stabilizing light-colored sulfited phenolic syntans prepared as described in Example 2 when the free $SO_2$ is allowed to remain in the syntan solution.

Since the process of my copending application referred to above results in the formation of light-colored syntan solutions which are stable against discoloration upon storage and since my present process provides, in addition, protection of leather during the tanning operation, I prefer combining the two processes as illustrated by the foregoing example, i. e., incorporating a small amount of a vegetable tannin into a solution of a light-colored phenolic syntan.

Other vegetable tannins which may be used in place of those of the specific examples include oak bark extract, divi divi extract, and the like. Tannic acid itself is also suitable and is included within the scope of the term "vegetable tannins."

In the past, as has been acknowledged in the early part of the present specification, mixtures of phenolic or other syntans with vegetable tannins have been used by the tanner to cheapen the phenolic syntan with what actually amounts to an inexpensive diluent. In these mixtures each type tanning material contributes to the tanning action of the mixture as a whole. The phenolic syntan and the vegetable tannin are supplied separately to the tanner who mixes them at the time of, or just prior to, their use. These mixtures which contain better than 50% vegetable tannin are not pre-formed and supplied to the tanner as such. The present invention depends upon my discovery that a very small proportion of vegetable tannin, i. e., too little to exert any appreciable tanning action or to effect a real cheapening of the syntan, admixed with a phenolic syntan will stabilize and protect it against discoloration upon storage and under tanning conditions. Based on the resin solids of the aqueous solution, I have found it necessary to add only from about 1% to about 10% by weight of vegetable tannin liquid extract which normally contains from about 25% to about 35% tannin. Corresponding quantities of solid extracts containing usually from about 50% to about 90% tannin are used. The "resin solids" include the phenol-formaldehyde content of the solution excluding sulfoxy groups and other substituents of the resin, salts present in the solution and the like.

If desired my new stabilized syntan solutions may be dried by any suitable conventional means and stored in the dry form. In such a case, it is only necessary to dissolve the dry syntan in water prior to its use.

To achieve maximum effectiveness the vegetable tannins must be added to the phenolic syntan solution before any darkening of initial color takes place. This will normally mean addition immediately after preparation although some phenolic syntans retain their initial color for some time after their preparation if they are kept in the dark; they are not light stable as are my mixtures. However, less striking but nonetheless advantageous results may be obtained if some slight discoloration has already occurred and the vegetable tannin is used to arrest it. The importance of my invention lies in the fact that after the small amount of vegetable tannin is incorporated with the phenolic syntan, the syntan solution becomes light stable, i. e., it will not discolor appreciably upon standing in sunlight at temperatures of from about 10° to about 40° C. for at least two months, as evidenced primarily by the fact that leather tanned with syntan solutions which have been stored under these so-called "normal conditions" of light and temperature is as light or nearly as light as leather tanned with the corresponding fresh solution and is much lighter than leather tanned with untreated syntan after comparable storage, and it will not discolor appreciably during the tanning operation itself, even under the conditions of drying which may involve temperatures up to about 60° C. In this latter connection which concerns the color or absence of color in the tanned leather rather than in the syntan solution, it should be understood of course that I am referring only to light stability against discoloration due to the syntan itself. Obviously discoloration of the leather resulting from the presence of impurities such as iron cannot be arrested by the present invention so the absence of such extraneous color-forming impurities in the syntan solution is assumed.

My invention is applicable to any and all phenolic syntans which tend to discolor (1) upon standing or storage under normal conditions as defined above, (2) during the tanning process of (3) during the period when the tanned leather is being dried, and hence produce discolored leathers. Such phenolic syntans which tend to discolor under any one or all of the three above-enumerated conditions are termed, for the sake of convenience, light unstable. My invention is particularly applicable to those syntans of the specific examples but analogous products in which the phenol is replaced wholly or in part by either of the naphthols, by any of the isomers of monoalkylated phenols in which the alkyl group contains from 1–5 carbon atoms such as the o-, m-, and p-cresols, the o-, m- and p-tertiary butyl phenols, or the o-, m- and p-amyl phenols and the like, or by a dihydric phenol such as resorcinol and catechol, etc., may also be stabilized with vegetable tannins according to my invention.

It is an advantage of the present invention that the use of small amounts of vegetable tannins to prevent color formation in phenolic syntans is extremely inexpensive and therefore presents a commercially attractive method for bringing about this result. In addition, whatever vegetable tannin is added will, of course, not detract from the tannin effect of the syntan solution.

It is surprising, and a definite advantage of the present invention, that although the addition of vegetable tannin to phenolic syntan solutions makes them darker in color than they would otherwise be, leathers tanned with the darker mixtures are very light in color, varying in shade from a light cream to a cream or pink tan, and even lighter in color than leathers tanned with the untreated phenolic syntan solutions after both treated and untreated solutions have been standing for a comparable period of time. Vegetable tannin alone ordinarily produces a medium to dark brown leather so it is surprising that it has no more influence on the color of leather tanned with the mixtures of the present invention.

Another advantage of the present invention lies in the fact that the light-colored leathers produced may be dyed to clear shades of light pastel colors as well as to the more usual full colors.

It is a further advantage of the present invention that leathers tanned with the stabilized syntans of the present invention are of a uniform shade. This is in contrast to leathers tanned with unstabilized phenolic syntans in which the color is so intense that the leather can only be used in dark brown colors which will be "muddy" because of the undertone of the syntan, and the intensity of the color varies not only from pack to pack, thus making it troublesome to produce a long run of dyed leather of a uniform shade, and also from one portion of a single skin to another.

The stabilized phenolic syntans of the present invention may be used alone or in conjunction with other tanning agents such as ligno-sulfonate, vegetable tannins, mineral tanning agents, formaldehyde, other synthetic tanning agents, and the like. In the latter case my new tanning agents may be used to after-tan leather already pre-tanned with another agent or agents, or skins and hides may be first tanned with the new agents and then with a tanning agent of another type.

As has been stated above, the discoloration referred to in the present specification and claims is only that which the phenolic syntans themselves undergo on storage, during the tanning process or during the drying of the leather. Such discolored leather is bright pink to deep red to purple or mottled orange-red in color. The discoloration is believed to be due to air and/or light, but I do not wish to be limited to any particular theory thereof. Discoloration which results from other factors such as the presence of iron, lime blast, bacterial or fungus growth, and the like are not prevented by the present invention.

I claim:

1. A tanning agent which comprises an aqueous solution of a light-unstable phenolic syntan, which has undergone substantially no darkening of its initial color, containing from about 1% to about 10% by weight of a vegetable tannin liquid extract, based on the resin solids content of said aqueous solution, said phenolic syntan being of the sulfonated phenol-formaldehyde condensation product type.

2. A tanning agent as in claim 1 wherein the vegetable tannin is chestnut extract.

3. A tanning agent as in claim 1 wherein the light-unstable phenolic syntan is a nuclearly sulfonated phenol-formaldehyde condensation product.

4. A tanning agent as in claim 1 wherein the phenolic syntan is a condensation product of phenol, formaldehyde and an alkaline salt of sulfurous acid.

5. A tanning agent which comprises an aqueous solution of a light-unstable phenolic syntan, which has undergone substantially no darkening of its initial color, containing from about 1% to about 10% by weight of a vegetable tannin liquid extract, based on the resin solids content of said aqueous solution, said light-unstable phenolic syntan being a light-colored condensation product of phenol, formaldehyde and a sufficient amount of a salt of sulfurous acid to ensure the presence of free sulfur dioxide in the reaction mixture throughout the condensation.

6. A process of stabilizing a phenolic syntan against discoloration when exposed to light at temperatures of from about 10°–60° C. which comprises incorporating in an aqueous solution of a light-unstable phenolic syntan, which has undergone substantially no darkening of its initial color, from about 1% to about 10% by weight of a vegetable tannin liquid extract, based on the resin solids content of said aqueous solution, said phenolic syntan being of the sulfonated phenol-formaldehyde condensation product type.

DANIEL E. NAGY.

REFERENCES CITED

The following references are of record in the file of this patent:

UNITED STATES PATENTS

| Number | Name | Date |
|---|---|---|
| 1,539,517 | Schmidt | May 26, 1925 |
| 2,017,863 | Jaeger | Oct. 22, 1935 |

FOREIGN PATENTS

| Number | Country | Date |
|---|---|---|
| 148,898 | Great Britain | 1920 |

OTHER REFERENCES

"Progress in Leather Science," 1920–1945, page 258, published 1948 by Printing Craft, Ltd., Mansfield, Eng.

Jour. Am. Lea. Chem. Assoc., page 415, June 1949.